(12) United States Patent
Kim et al.

(10) Patent No.: US 10,923,939 B2
(45) Date of Patent: Feb. 16, 2021

(54) WIRELESS POWER TRANSMITTER AND RECEIVER

(71) Applicant: LG ELECTRONICS INC., Seoul (KR)

(72) Inventors: Hyoungseok Kim, Seoul (KR); Jeongkyo Seo, Seoul (KR); Jinmoo Park, Seoul (KR); Beomseok Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/325,540

(22) PCT Filed: Dec. 16, 2016

(86) PCT No.: PCT/KR2016/014762
§ 371 (c)(1),
(2) Date: Feb. 14, 2019

(87) PCT Pub. No.: WO2018/034392
PCT Pub. Date: Feb. 22, 2018

(65) Prior Publication Data
US 2019/0207411 A1 Jul. 4, 2019

(30) Foreign Application Priority Data

Aug. 16, 2016 (KR) .................. 10-2016-0103607

(51) Int. Cl.
H02J 7/02 (2016.01)
H04B 5/00 (2006.01)
(Continued)

(52) U.S. Cl.
CPC .............. H02J 7/025 (2013.01); H01F 27/38 (2013.01); H01F 38/14 (2013.01); H02J 50/10 (2016.02);
(Continued)

(58) Field of Classification Search
CPC .. H02J 7/025; H02J 50/80; H02J 50/90; H02J 50/10; H02J 50/12; H02J 50/40;
(Continued)

(56) References Cited

U.S. PATENT DOCUMENTS

2012/0161535 A1* 6/2012 Jung ................. H01F 38/14
307/104
2016/0380488 A1* 12/2016 Widmer ................. H02J 50/10
324/207.15

FOREIGN PATENT DOCUMENTS

KR 10-2012-0047548 A 5/2012
KR 10-2012-0127991 A 11/2012
(Continued)

Primary Examiner — Robert L Deberadinis
(74) Attorney, Agent, or Firm — Birch, Stewart, Kolasch & Birch, LLP

(57) ABSTRACT

According to one embodiment of the present invention, a wireless power transmitter for transferring power to a wireless power receiver, the wireless power transmitter includes a coil assembly including a plurality of coils, a power conversion unit configured to convert an input direct current (DC) into an alternating current (AC) for driving the coil assembly, and a communication/control unit configured to communicate with the wireless power receiver and control an amount of power to be transferred to the wireless power receiver using the coil assembly, wherein the plurality of coils are arranged in first and second directions, wherein each of the plurality of coils has a substantially rectangular frame structure having a through hole at a center, and is arranged so that at least portion of the each coil overlaps, in a plane, with a neighboring coil in the first and second directions.

20 Claims, 15 Drawing Sheets (a)              (b)

(c)              (d)

(51) Int. Cl.
*H02J 50/90* (2016.01)
*H02J 50/80* (2016.01)
*H01F 27/38* (2006.01)
*H02J 50/10* (2016.01)
*H01F 38/14* (2006.01)
*H02J 50/40* (2016.01)
*H02J 50/12* (2016.01)

(52) U.S. Cl.
CPC .............. *H02J 50/80* (2016.02); *H02J 50/90* (2016.02); *H04B 5/0037* (2013.01); *H04B 5/0081* (2013.01); *H02J 50/12* (2016.02); *H02J 50/40* (2016.02)

(58) Field of Classification Search
CPC . H02J 7/02; H01F 27/38; H01F 38/14; H04B 5/0037; H04B 5/0081; H04B 5/00
See application file for complete search history.

(56) References Cited

FOREIGN PATENT DOCUMENTS

| | | |
|---|---|---|
| KR | 10-2012-0133573 A | 12/2012 |
| KR | 10-2015-0010460 A | 1/2015 |
| KR | 10-2015-0082419 A | 7/2015 |
| WO | WO 2014/122121 A1 | 8/2014 |
| WO | WO 2015/160510 A1 | 10/2015 |

\* cited by examiner

[FIG. 1]
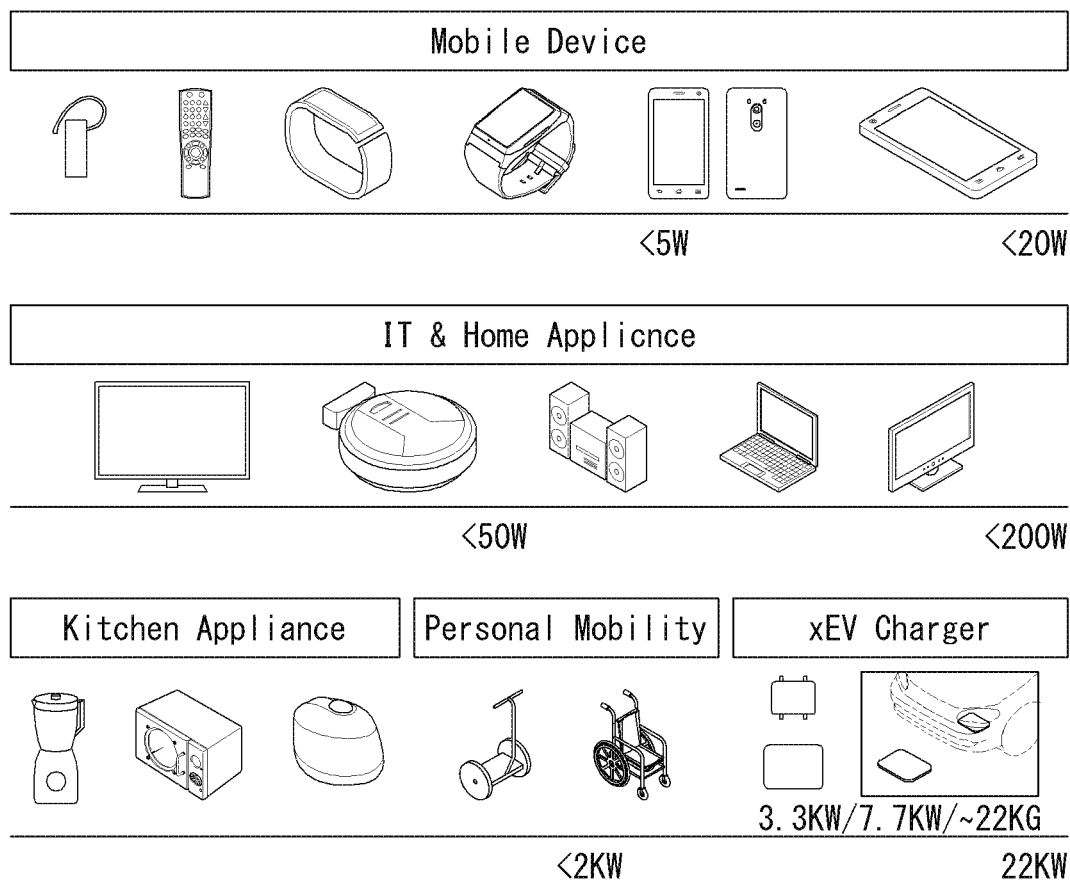

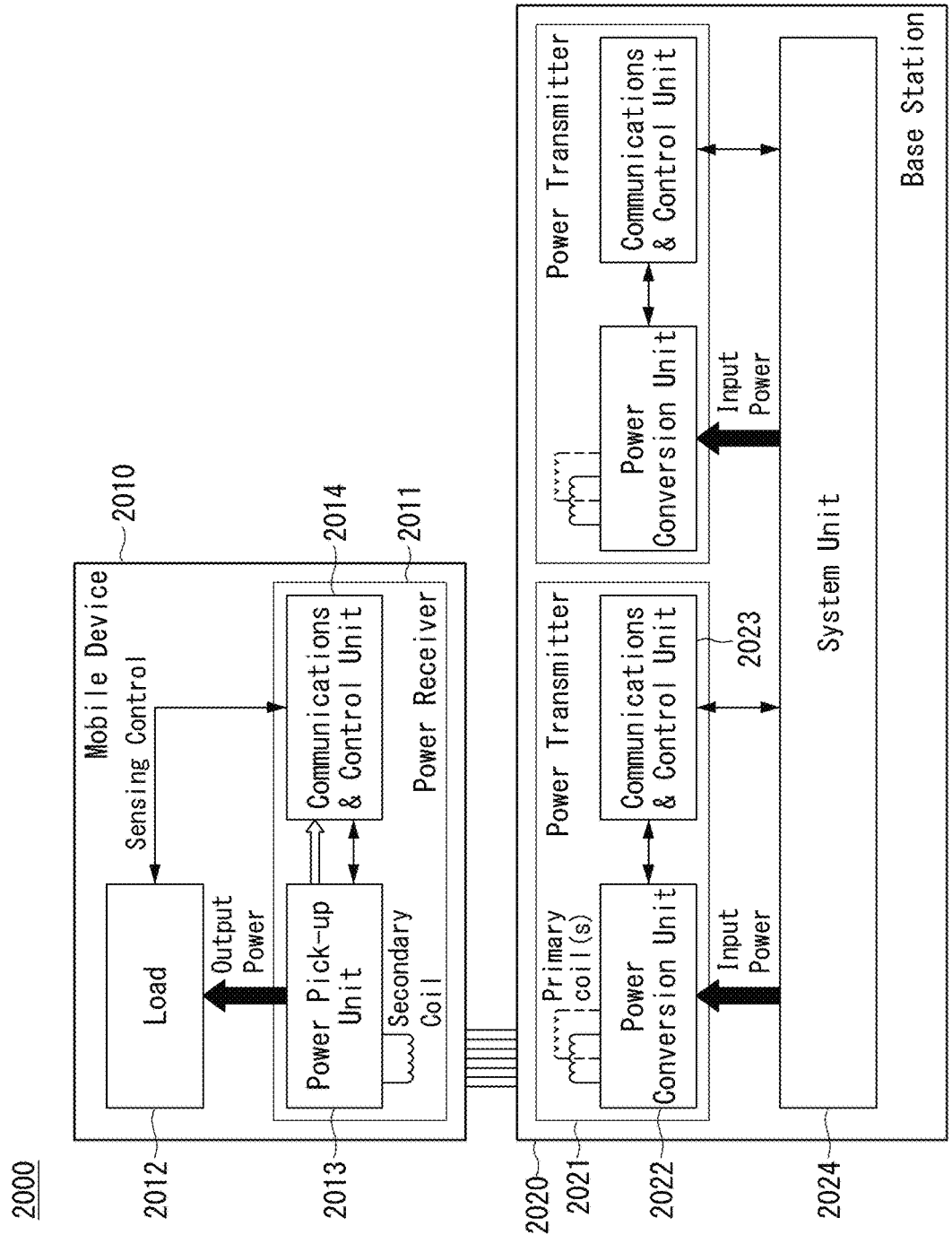
[FIG. 2]

[FIG. 3]
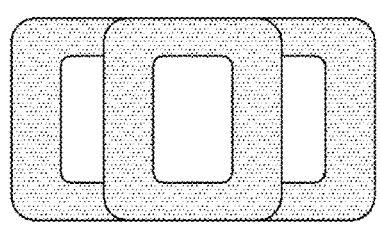
(a)
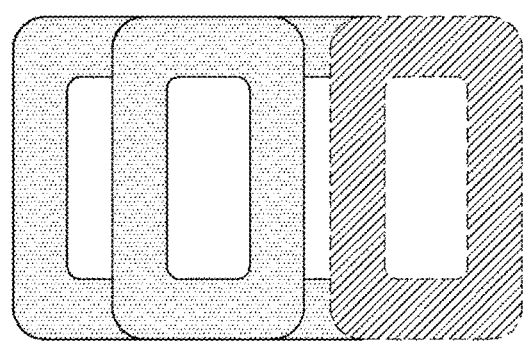
(b)
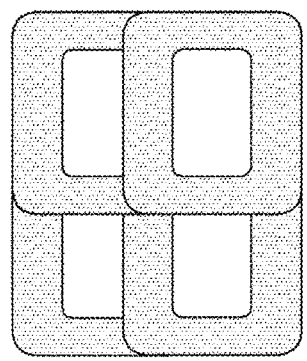
(c)
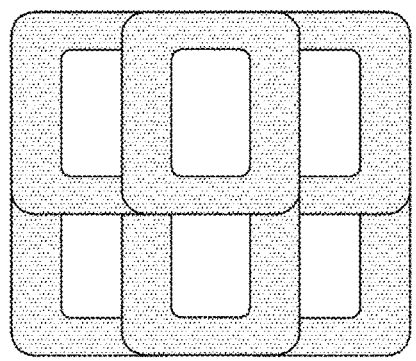
(d)

[FIG. 4]
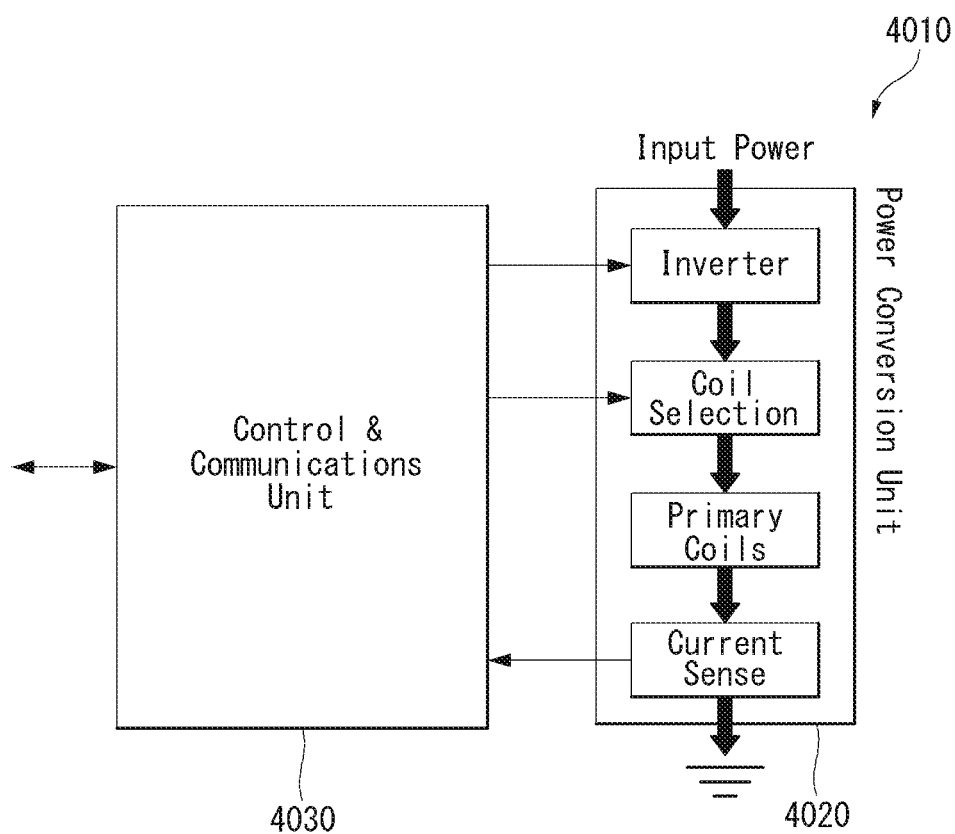

[FIG. 5]
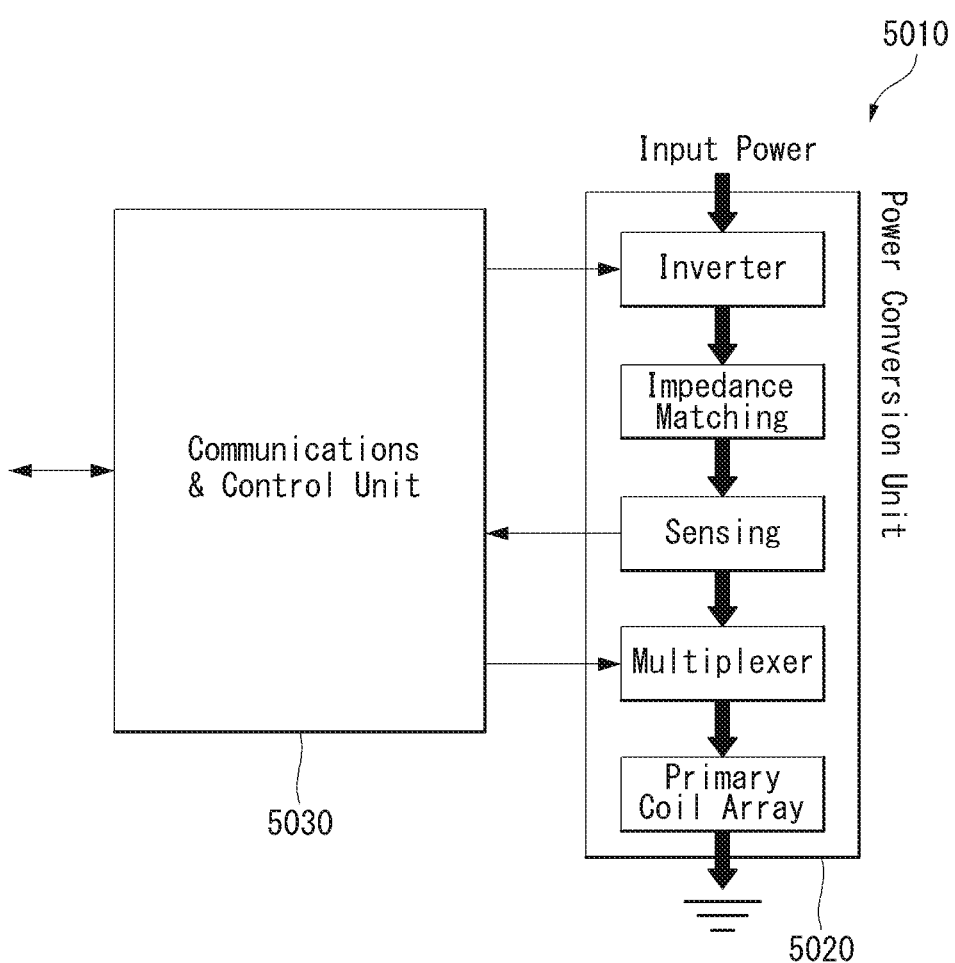

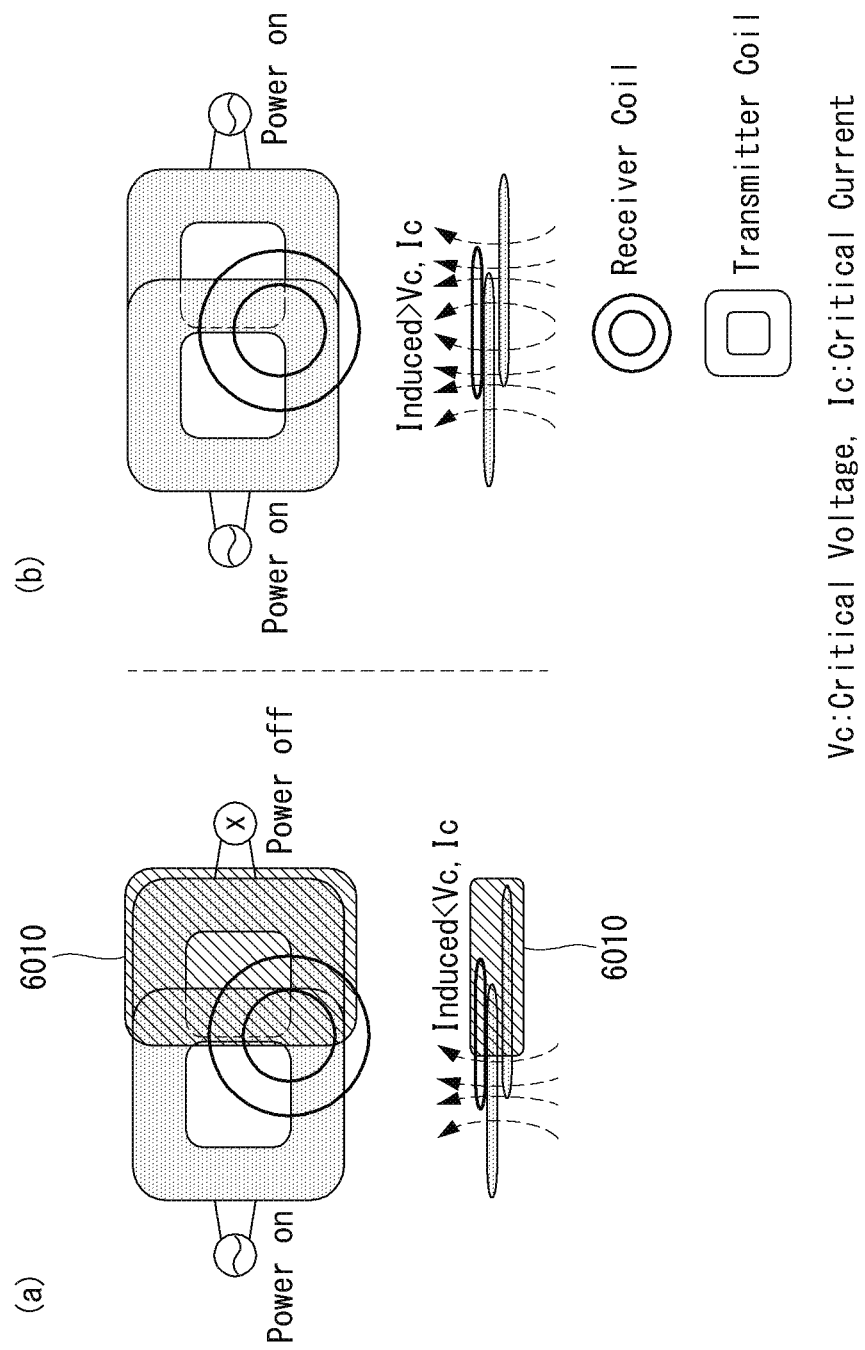

[FIG. 7]
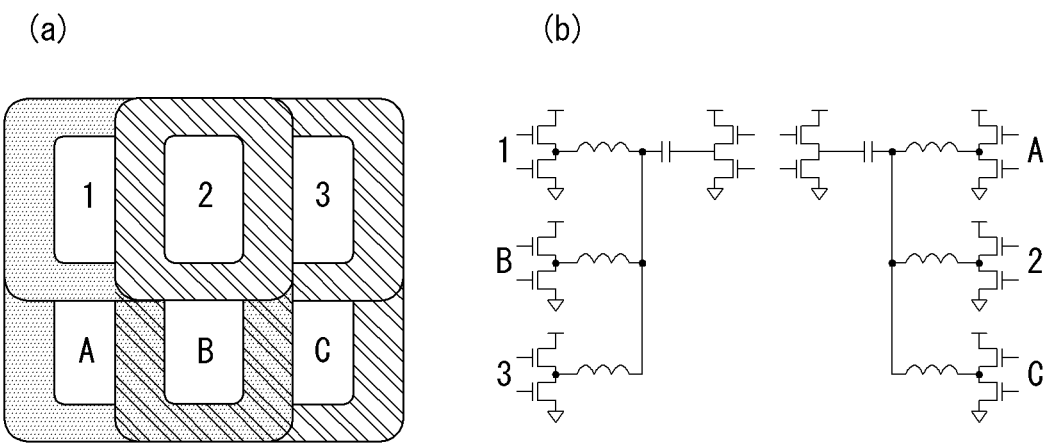

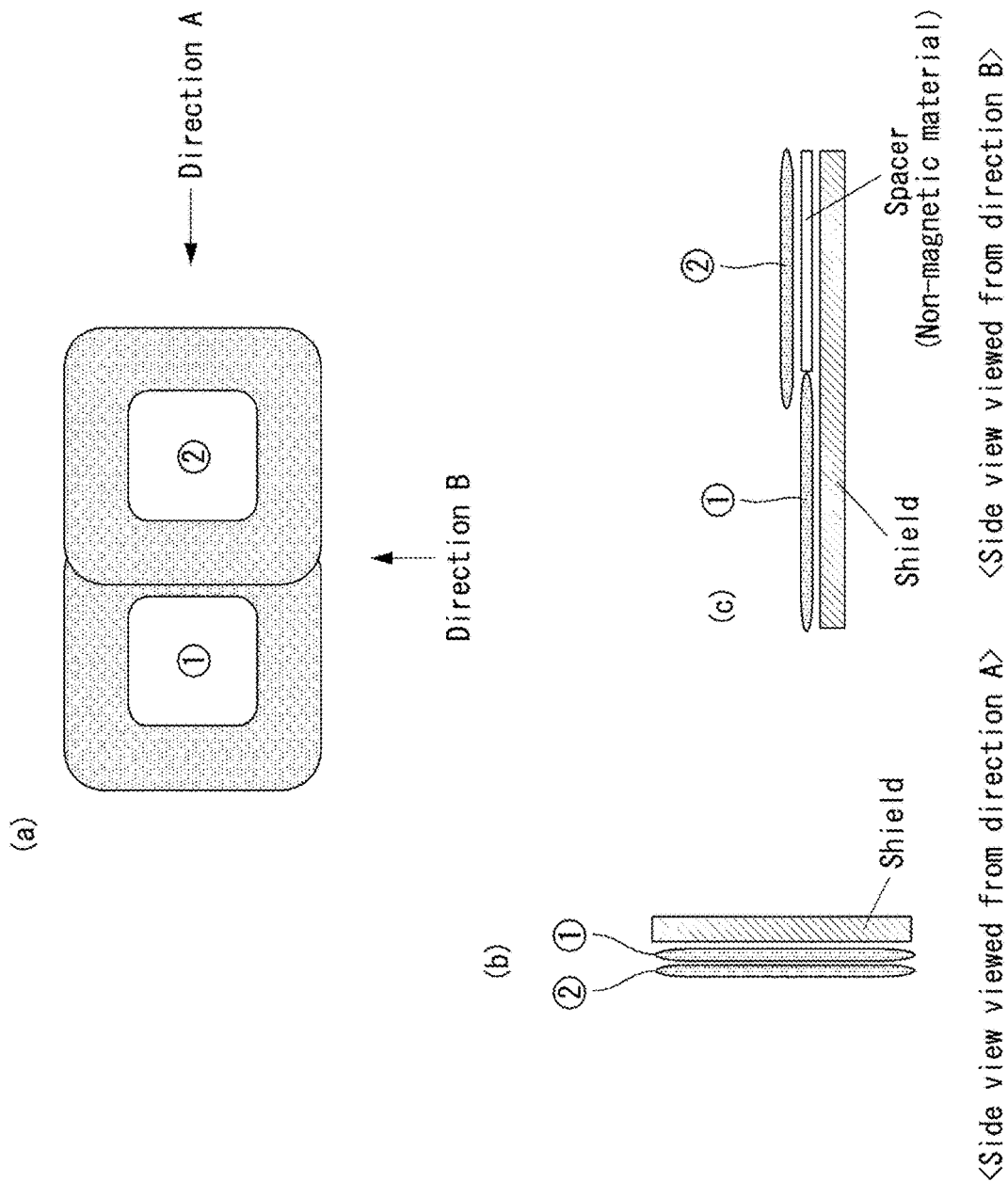

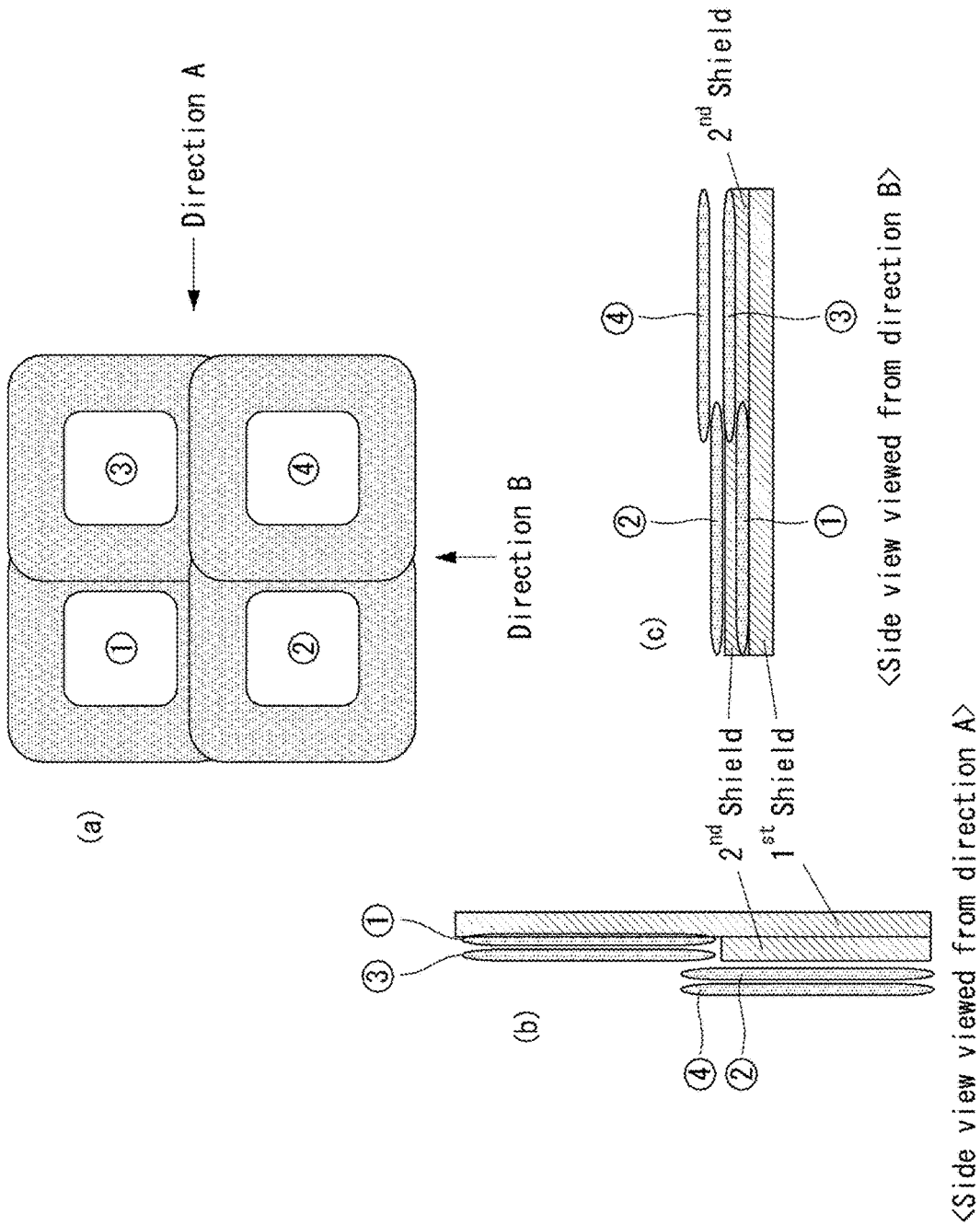
[FIG. 9]

[FIG. 10]
(a)
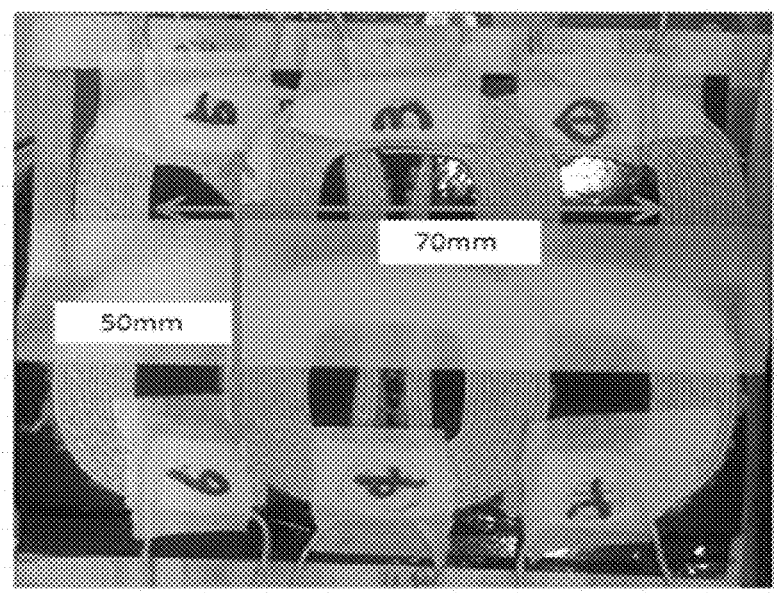
(b)
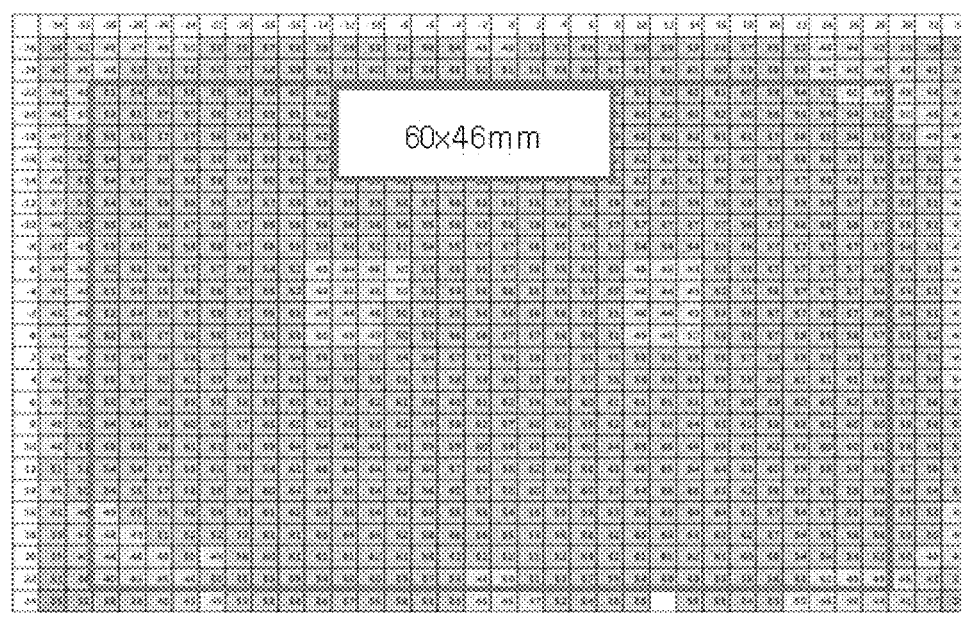

[FIG. 11]
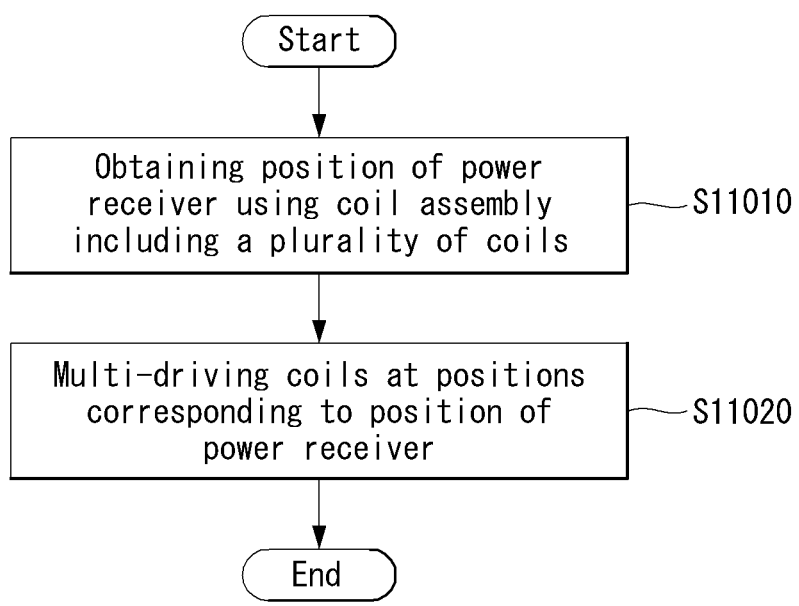

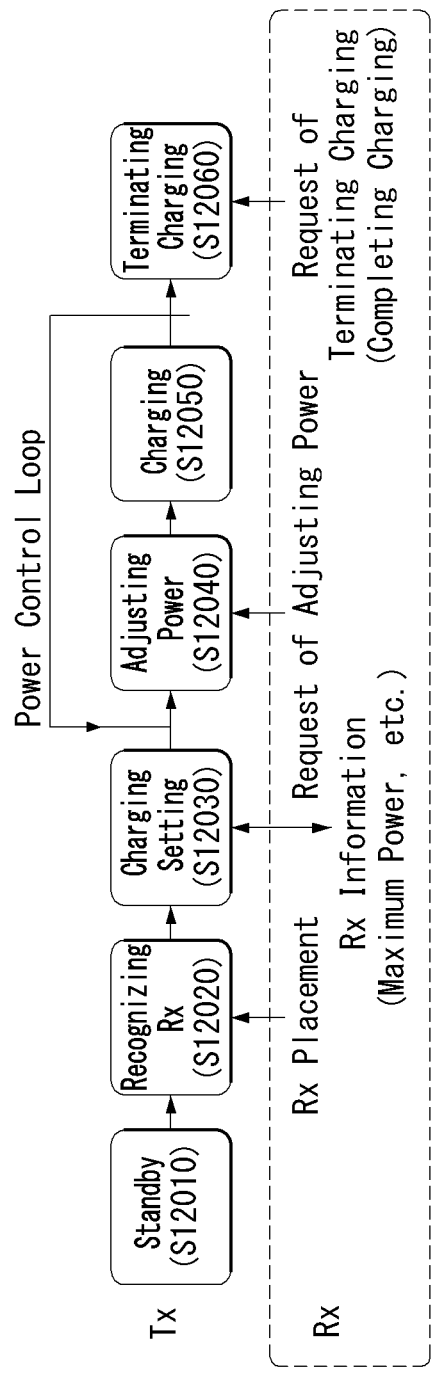

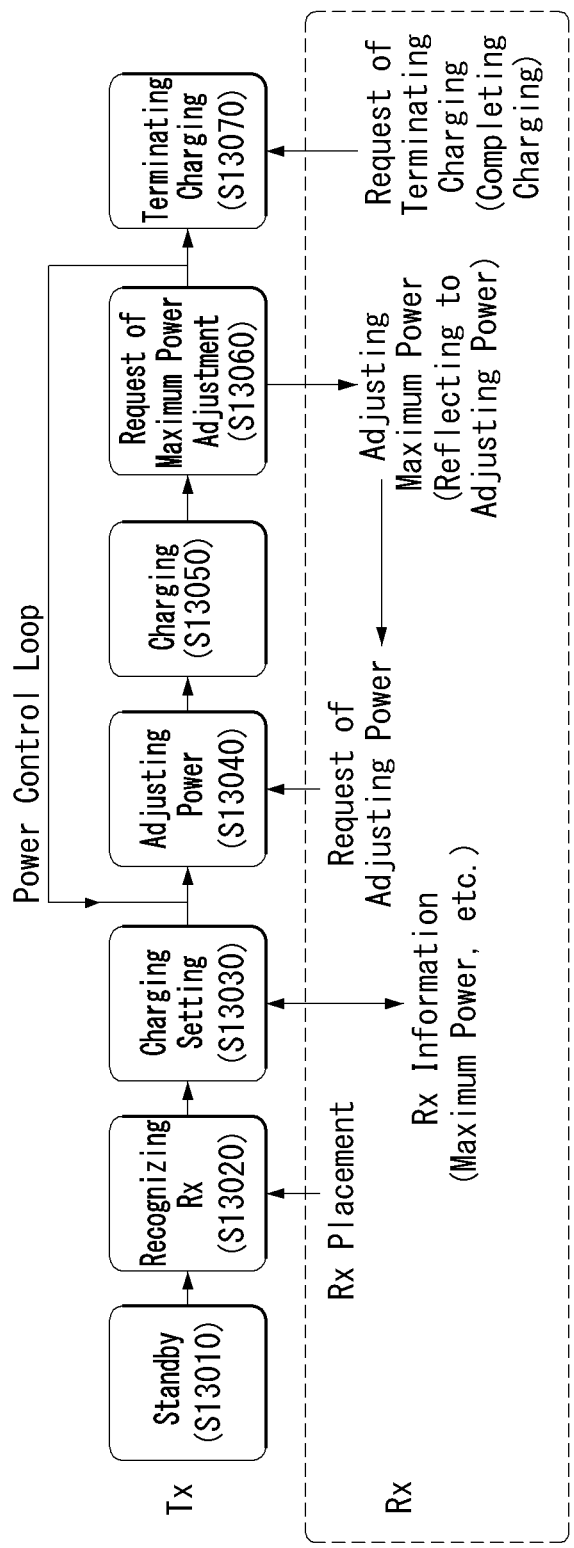

[FIG. 14]
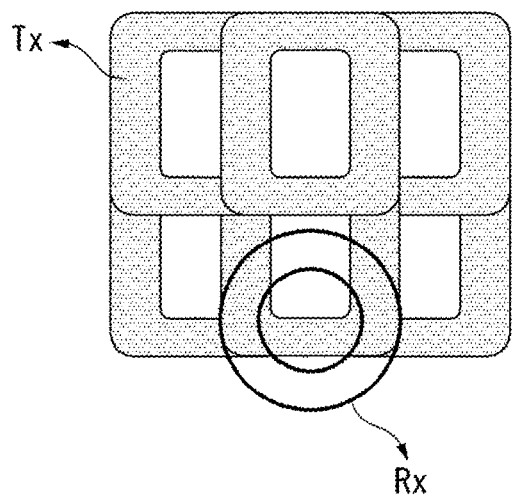

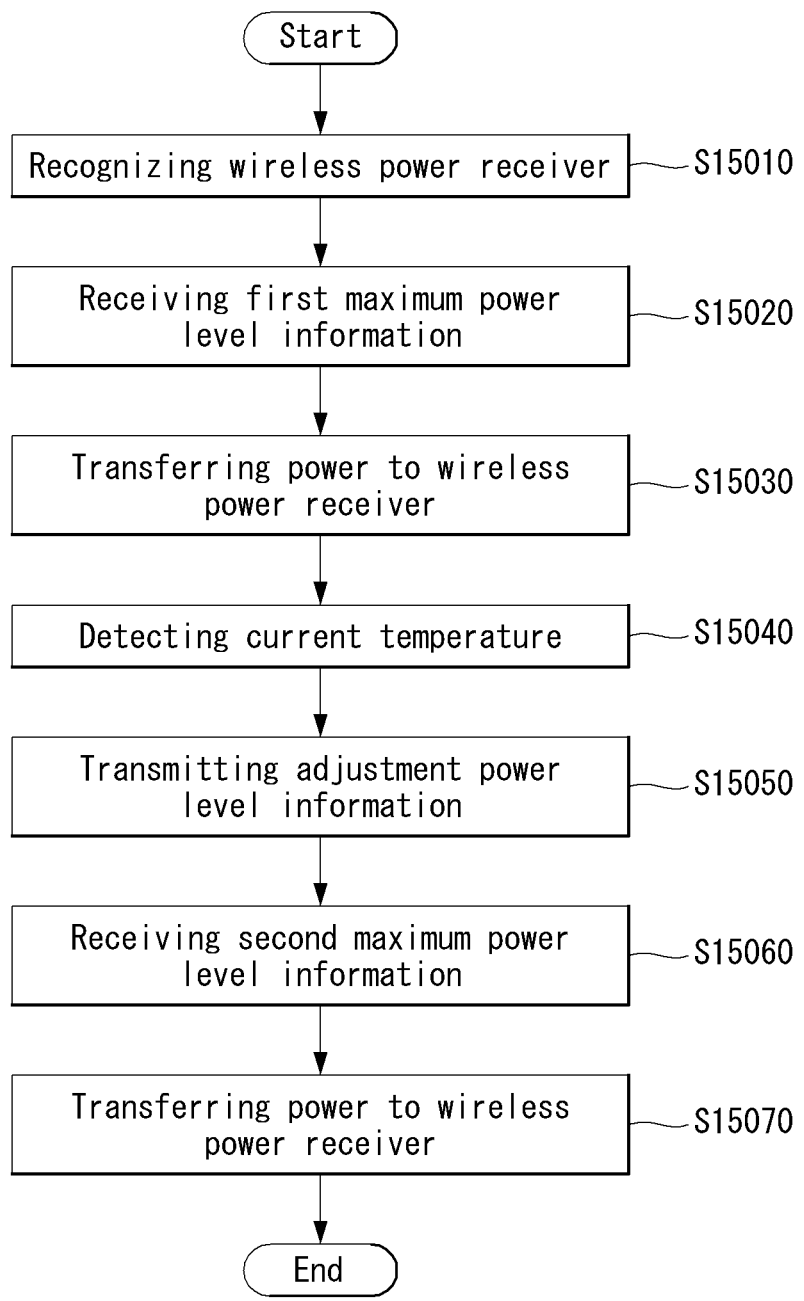

WIRELESS POWER TRANSMITTER AND RECEIVER

CROSS REFERENCE TO RELATED APPLICATIONS

This application is the National Phase of PCT International Application No. PCT/KR2016/014762, filed on Dec. 16, 2016, which claims priority under 35 U.S.C. 119(a) to Patent Application No. 10-2016-0103607, filed in the Republic of Korea on Aug. 16, 2016, all of which are hereby expressly incorporated by reference into the present application.

TECHNICAL FIELD

The present invention relates to a structure and a control method of a wireless power transmitter and a wireless power receiver.

BACKGROUND ART

A contactless wireless charging method is an energy transfer method for electromagnetically transferring energy without using a wire in a method for sending energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

DETAILED DESCRIPTION OF INVENTION

Technical Problem

An object of the present invention is to propose a coil assembly structure of a new wireless power transmitter having a wide charging area and a good charging efficiency/performance.

Furthermore, another object of the present invention is to propose a bidirectional communication protocol between wireless power transference and reception that can flexibly adjust a transference power level according to a charging environment/situation of a wireless power transmitter.

Technical Solution

According to one embodiment of the present invention, a wireless power transmitter for transferring power to a wireless power receiver, the wireless power transmitter includes a coil assembly including a plurality of coils, a power conversion unit configured to convert an input direct current (DC) into an alternating current (AC) for driving the coil assembly, and a communication/control unit configured to communicate with the wireless power receiver and control an amount of power to be transferred to the wireless power receiver using the coil assembly, wherein the plurality of coils are arranged in first and second directions, wherein each of the plurality of coils has a substantially rectangular frame structure having a through hole at a center, and is arranged so that at least portion of the each coil overlaps, in a plane, with a neighboring coil in the first and second directions.

Furthermore, the first and second directions may be substantially orthogonal to each other.

Furthermore, the first direction may correspond to a vertical direction or an up-and-down direction, and the second direction may correspond to a horizontal direction or a left-to-right direction, respectively.

Furthermore, the plurality of coils may be arranged in a superimposed manner so that the through hole of the each coil is adjacent to a through hole of the neighboring coil in the first or second direction.

Furthermore, the plurality of coils may be comprised of six coils.

Furthermore, the plurality of coils may have different numbers of turns and sizes from each other, to have substantially a same inductance value.

Furthermore, the power conversion unit may be configured to obtain a position of the wireless power receiver using the coil assembly, select a plurality of coils at a position corresponding to the position of the wireless power receiver, and apply the AC to the selected plurality of coils.

Furthermore, the selected plurality of coils by the power conversion unit may correspond to a coil pair neighboring in the first or second direction.

Furthermore, the power conversion unit may be configured to apply the AC to the coil pair so that the AC flows in the same direction of rotation in the selected coil pair.

Furthermore, a power transference method of a wireless power transmitter for transferring power to a wireless power receiver according to another embodiment of the present invention, the power transference method includes obtaining a position of the wireless power receiver using a coil assembly including a plurality of coils, and multi-driving coils, among the plurality of coils, at a position corresponding to the position of the wireless power receiver, wherein the multi-driving includes applying simultaneously an alternating current (AC) to a coil pair so that the AC flows in a same direction of rotation in the coil pair, and wherein the coil pair, among the plurality of coils, are located in a position corresponding to the position of the wireless power receiver and are neighboring coils in a first or second direction.

Furthermore, the plurality of coils may be arranged in first and second directions. Each of the plurality of coils may have a substantially rectangular frame structure having a through hole at a center, and may be arranged so that at least portion of the each coil overlaps, in a plane, with a neighboring coil in the first and second directions.

Furthermore, the first and second directions may be substantially orthogonal to each other.

Furthermore, the first direction may correspond to a vertical direction or an up-and-down direction, and the second direction may correspond to a horizontal direction or a left-to-right direction, respectively.

Furthermore, a power transference method of a wireless power transmitter for transferring power to a wireless power receiver according to other embodiment of the present invention, the power transference method includes recognizing the wireless power receiver, receiving, from the wireless power receiver, first maximum power level information about a first maximum power level that the wireless power receiver is capable of receiving, transferring the power to the wireless power receiver at a power level determined based on the first maximum power level information, detecting a current temperature, transmitting, to the wireless power receiver, adjustment power level information indicating a power level that is greater than or less than the first maximum power level based on the detected current temperature, receiving, from the wireless power receiver, second maximum power level information about a second maximum power level adjusted based on the adjustment power level information, and transferring the power to the wireless power receiver at a power level determined based on the second maximum power level information.

Furthermore, the adjustment power level information may indicate a lower power level than the first maximum power level when the detected current temperature is higher than a predetermined temperature, and a higher power level than the first maximum power level when the detected current temperature is lower than the predetermined temperature.

Furthermore, the power transference method may further include obtaining, when the wireless power transmitter includes a coil assembly comprised of a plurality of coils, a position of the wireless power receiver using the coil assembly, and transmitting to the wireless power receiver information about a maximum power level that the wireless power transmitter is capable of supplying based on the obtained position of the wireless power receiver.

Furthermore, the maximum power level when obtaining a first position as the position of the wireless power receiver may be set to be greater than the maximum power level when obtaining a second position as the position of the wireless power receiver.

Furthermore, the first position may correspond to a center part of the coil assembly of the wireless power transmitter, and the second position may correspond to an outer part of the coil assembly of the wireless power transmitter.

Furthermore, the power transference method may further include multi-driving, when the first position is obtained as the position of the wireless power receiver, at least some of the plurality of coils included in the coil assembly, and selectively driving one coil, among the plurality of coils included in the coil assembly, at a position corresponding to the second position when the second position is obtained as the position of the wireless power receiver.

Furthermore, a power receiving method of a wireless power receiver for receiving power from a wireless power receiver according to the other embodiment of the present invention, the power receiving method includes recognizing the wireless power transmitter, transmitting to the wireless power transmitter first maximum power level information about a first maximum power level that the wireless power receiver is capable of receiving, receiving the power from the wireless power transmitter at a power level which is identical to or lower than the first maximum power level, receiving, from the wireless power transmitter, adjustment power level information indicating a power level that is greater than or less than the first maximum power level, receiving, from the wireless power transmitter, second maximum power level information about a second maximum power level obtained by adjusting the first maximum power level based on the adjustment power level information, and receiving the power from the wireless power transmitter at a power level which is identical to or lower than the second maximum power level.

Advantageous Effects

According to an embodiment of the present invention, since a multi-coil drive system is applied to a coil assembly, a chargeable area is wide and a non-chargeable area is minimized, so that a charging performance/efficiency is increased.

Furthermore, according to an embodiment of the present invention, a bidirectional communication between wireless power transceivers allows transference power to be determined/adjusted/negotiated at a level suitable for a current charging situation of the wireless power transceiver, so that it has an effect that a wireless power transmitter is capable of transferring power more securely to a wireless power receiver.

In addition to the above, various effects according to the embodiment of the present invention will be described below in detail.

DESCRIPTION OF DRAWINGS

FIG. 1 is a diagram illustrating an embodiment of various electronic devices in which a wireless charge system is introduced.

FIG. 2 is a block diagram of a wireless power transmitting/receiving system according to an embodiment of the present invention.

FIG. 3 is a view showing a coil structure according to an embodiment of the present invention.

FIG. 4 is a block diagram illustrating a power transmitter including a coil assembly according to a first or second embodiment.

FIG. 5 is a block diagram illustrating a power transmitter including a coil assembly according to a third or fourth embodiment.

FIG. 6(a) is a view showing an application example in which a single-coil drive system is applied to a coil assembly. FIG. 6(b) is a view showing an application example of a multi-coil driving method.

FIG. 7 is a diagram illustrating a coil assembly structure and an equivalent circuit according to an embodiment of the present invention.

FIG. 8(a) is a plan view of a coil assembly comprised of two coils, FIG. 8(b) is a side view of a coil assembly viewed from direction A, and FIG. 8(c) is a side view of a coil assembly viewed from direction B.

FIG. 9(a) is a plan view of a coil assembly comprised of four coils, FIG. 9(b) is a side view of a coil assembly viewed from direction A, and FIG. 9(c) is a side view of a coil assembly viewed from direction B.

FIG. 10 is a graph showing experimental results of a charging area of a power transmitter using a coil assembly structure according to an embodiment of the present invention.

FIG. 11 is a flowchart illustrating a power transference method of a power transmitter according to an embodiment of the present invention.

FIG. 12 is a flowchart illustrating a charging control process in a wireless power transference/reception period for wireless power transference according to an embodiment of the present invention.

FIG. 13 is a flowchart illustrating a charging control process between wireless power transceivers Tx, Rx for wireless power transference in according to an embodiment of the present invention.

FIG. 14 is a diagram illustrating a method of controlling overheat prevention in a multi-coil according to an embodiment of the present invention.

FIG. 15 is a flowchart illustrating a power transference method of a wireless power transmitter according to an embodiment of the present invention.

BEST MODE FOR INVENTION

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

An embodiment of the present invention relates to a wireless charging system to which the resonant method has been added and proposes a wireless charging transmitter/receiver using the resonant method, which is compatible with a wireless charging transmitter/receiver using an electromagnetic induction method supporting low power/middle power.

Hereinafter, a wireless power transmitter and wireless power receiver of a resonant type proposed by an embodiment of the present invention and a wireless charging method and a communication protocol using the wireless power transmitter and wireless power receiver are described below. Hereinafter, a wireless power transmitter may be abbreviated as a power transmitter or a transmitter, and a wireless power receiver may be abbreviated as a power receiver or a receiver.

FIG. 1 shows an embodiment of various electronic devices into which a wireless charging system is introduced.

FIG. 1 shows that electronic devices are classified depending on an amount of power that is transmitted and received in a wireless charging system.

Referring to FIG. 1, a small power (about 5 W or less or about 20 W or less) wireless charging method may be applied to wearable devices, such as a smart watch, smart glass, a head mounted display (HMD), and a smart ring, and mobile electronic devices (or portable electronic devices), such as an earphone, a remote controller, a smart phone, a PDA, and a tablet PC. A middle power (about 50 W or less or about 200 W or less) wireless charging method may be applied to middle/small-sized home appliances, such as a notebook computer, a robot clearer, TV, audio equipment, and a monitor. A large power (about 2 kW or less or 22 kW or less) wireless charging method may be applied to kitchen equipment, such as a mixer, a microwave, and an electric rice cooker, and personal mobile devices (or electronic devices/mobile means), such as a wheel chair, an electric kickboard, an electric bicycle, and an electric vehicle.

Each of the aforementioned electronic devices/mobile means (or shown in FIG. 1) may include a wireless power receiver to be described later. Accordingly, the aforementioned electronic devices/mobile means may be wirelessly charged with power received from a wireless power transmitter.

Hereinafter, a mobile device to which the small wireless charging method is applied is chiefly described for convenience of description, but this is only an embodiment. A wireless charging method in accordance with an embodiment of the present invention may be applied to the aforementioned various electronic devices.

FIG. 2 is a block diagram of a wireless power transmission/reception system in accordance with an embodiment of the present invention.

Referring to FIG. 2, a wireless power transmission/reception system 2000 includes a mobile device 2010 configured to wirelessly receive power and a base station 2020 configured to wirelessly transfer (or transmit) power. Hereinafter, the mobile device may also be called a "power receiver product", and the base station may also be called a "power transmitter product."

The mobile device 2010 includes a power receiver 2011 for wirelessly receiving power through a secondary coil and a load 2012 for receiving power received by the power receiver 2011, storing the received power, and supplying the stored power to a device.

The power receiver 2011 may include a power pick-up unit 2013 and a communications & control unit 2014. The power pick-up unit 2013 may receive a wireless power signal through the secondary coil and convert the received signal into electric energy. The communications & control unit 2014 may control the transmission/reception of a power signal (or power).

The base station 2020 is a device for providing inductive power or resonant power, and may include at least one power transmitter 2021 or a system unit 2024.

The power transmitter 2021 may send inductive power or resonant power and control such transmission. The power transmitter 2021 may include a power conversion unit 2022 configured to convert electric energy into a power signal by generating a magnetic field through a primary coil(s) and a communications & control unit 2023 configured to control communication and power transfer with the power receiver 2011 so that power of a proper level is transferred. The system unit 2024 may perform control of other operations of the base station 2020, such as input power provisioning, control of a plurality of power transmitters, and control of a user interface.

The power transmitter 2021 can control transference power by controlling an operating point. The controlled operating point may correspond to a combination of a frequency (or phase), a duty cycle, a duty ratio, and a voltage amplitude. The power transmitter 2021 can control the transference power by adjusting at least one of the frequency (or phase), the duty cycle, the duty ratio, and the voltage amplitude.

Further, the power transmitter 2021 supplies constant power, and the power receiver 2011 controls a resonance frequency, so that the received power can also be controlled.

In the present specification, a (primary/secondary) coil or coil portion may include a coil and at least one element adjacent to the coil, and may be referred to as a coil assembly, a coil cell, or a cell.

With reference to FIG. 2, the above-mentioned wireless power transference/reception system may be a system in which a new configuration unit is added or some of the configuration units is omitted depending on a structure and a coil driving method of the coil and/or coil assembly included in the wireless power transference/reception system.

Hereinafter, embodiments of various structures of the coil assembly included in the power transmitter will be described, and a block diagram of the power transmitter according to each embodiment will be described.

FIG. 3 is a view showing a coil structure according to an embodiment of the present invention. In particular, FIG. 3(*a*) a view showing a first embodiment of a coil assembly comprised of three (primary) coils, FIG. 3(*b*) a view showing a second embodiment of a coil assembly comprised of three (or four) (primary) coils, FIG. 3(*c*) a view showing a third embodiment of a coil assembly comprised of four (primary) coils, and FIG. 3(*d*) is a view showing a fourth embodiment of a coil assembly comprised of six (primary) coils, respectively.

Each of a plurality of coils included in the coil assembly proposed in this specification may correspond to a substantially rectangular frame structure having a through hole at a center.

Referring to FIG. 3(*a*), the first embodiment of the coil assembly included in a power transmitter may be configured in a form in which three coils are arranged in a line. At this time, the three coils may be arranged in a line so that at least a part of the three coils overlap each other. The size of each coil included in the coil assembly may be about 94 mm×53 mm (w/Ferrite), and the maximum charging area that can be generated by the coil assembly may be about 60 mm×20 mm (w/Ferrite).

The coil assembly of the first embodiment can operate in a single-coil drive system. In the present specification, the single-coil drive system can represent a method of driving only one coil at a time/simultaneously (i.e., applying current to only one coil at a time/simultaneously).

Referring to FIG. 3(*b*), the second embodiment of the coil assembly included in the power transmitter may be configured in a form in which three (or four) coils are arranged in a line. At this time, the three (or four) coils may be arranged in a line so that at least a part of them overlap each other. The size of each coil included in the coil assembly may be about 115 mm×68 mm (w/Ferrite), and the maximum charging area that can be generated by the coil assembly may be about 60 mm×40 mm (w/Ferrite) (in case of four, about 70 mm×40 mm (w/Ferrite)).

The arrangement and structure of the coil assembly of the second embodiment are substantially similar to those of the first embodiment, and there is a difference that the overall size of the coil assembly is increased.

The second embodiment can also operate in the single-coil drive system as the first embodiment.

Hereinafter, the configuration unit of the power transmitter including the coil assembly operating in the single-coil drive system will be described as in the first and second embodiments.

FIG. 4 is a block diagram illustrating a power transmitter including a coil assembly according to a first or second embodiment.

Referring to FIG. 4, a power transmitter 4010 may include a power conversion unit 4020 and a communication/control unit 4030, which are roughly two main units. The power conversion unit 4020 can perform communication with the communication/control unit 4030.

The power conversion unit 4020 may take charge of/include an analog part of the power transmitter design including the coil assembly according to the first or second embodiment. The power conversion unit 4020 may include an inverter, a coil selection block, and/or a current sense unit.

A direct current (DC) input of the power conversion unit 4020 (or the inverter) may be received and converted to an AC waveform for driving a resonant circuit including a series capacitor and a selected coil. Here, the selected coil may mean one coil suitably selected according to a position of the power receiver among the coils arranged in a line according to the first or second embodiment.

The power conversion unit 4020 (or the coil selection block) may select one coil in a position suitable for charging the power receiver among the coils included in the coil assembly, considering the position of the power receiver placed on the coil assembly.

The selection of the coil may be performed/proceed in real time as the power transmitter 4010 (or the power conversion unit 4020/the coil selection block) performs communications/attempts to communicate with the power receiver using at least one coil (or all the coils in order) included in the coil assembly. That is, the power transmitter 4010 (or the power conversion unit 4020/the coil selection block) can obtain the position of the power receiver by performing communication with the power receiver using at least one coil, and select one coil at a position corresponding to the position of the power receiver.

For example, the power transmitter 4010 (or the power conversion unit 4020/the coil selection block) may attempt to communicate with the power receiver using the first through third coils included in the coil assembly, and assume that the communication with the power receiver attempted using the first coil is successful. In this case, the power transmitter 4010 (or the power conversion unit 4020) can infer/predict that a current power receiver is lying on the first coil (or closest to the first coil), and can select the first coil as a coil to be driven for charging the power receiver.

Alternatively, although not shown in the drawing, the power transmitter 4010 may include a separate sensor (for example, a proximity sensor, an infrared sensor, or the like) for obtaining the position of the power receiver. In this case, the power transmitter 4010 may use the sensor to obtain the position of the power receiver, and may select a coil at a position suitable for charging the power receiver as a driving coil.

Finally, the power conversion unit 4020 (or the current sense unit) can continuously monitor the current flowing in the selected coil.

The communication/control unit 4030 may take charge of/include a digital logic part of the power transmitter design including the coil assembly according to the first or second embodiment.

More specifically, the communication/control unit 4030 can receive and decode a message transmitted from the power receiver, configure a coil selection block to be connected to a suitable coil, and execute a power control algorithm/protocol associated therewith. Further, the communication/control unit 4030 can control/drive a frequency of an AC waveform for controlling power transference. Further, the communication/control unit 4030 can interface with other subsystems of the base station (for example, for the purpose of user interface).

Although the power conversion unit 4020 and the communication/control unit 4030 are separately shown and described in this block diagram, the present invention is not limited thereto, and at least one of the functions performed by the power conversion unit 4020 is performed by the communication/control unit 4030, or at least one of the functions performed by the communication/control unit 4030 may be performed by the power conversion unit 4020. In addition, the power conversion unit 4020 and the communication/control unit 4030 may be formed of separate chips in hardware or may be formed of one chip.

The block diagram of the power transmitter 4010 operating in the single-coil drive system has been described above. Hereinafter, a structure and a block diagram of a coil assembly included in a power transmitter operating in a multi-coil drive system will be described.

Referring to FIG. 3(c), the third embodiment of the coil assembly included in the power transmitter may be configured in a form in which four coils are arranged in the first and second directions. More specifically, it may be configured in a form in which two coils are arranged in the first and second directions, respectively (2×2). Here, the first direction and the second direction may represent various directions intersecting with each other. For example, the first direction may correspond to an up→down direction (or a down→up direction), and the second direction may correspond to a left→right direction (or a right→left direction). At this time, the four coils may be arranged so that at least a part of the four coils overlap with each other in the first and second directions.

The size of each coil included in the coil assembly may be about 110 mm×70 mm (w/Ferrite), and the maximum charging area that can be generated by the coil assembly may be about 46 mm×46 mm (w/Ferrite).

The coil assembly of the third embodiment can operate in the multi-coil drive system. In the present specification, the multi-coil drive system can represent a method of simultaneously driving a plurality of coils at a time (i.e., applying current to the plurality of coils at a time/simultaneously).

Referring to FIG. 3(d), the fourth embodiment of the coil assembly included in the power transmitter may be configured in a form in which six coils are arranged in the first and second directions. More specifically, two coils in the first direction and three coils in the second direction may be arranged (3×2). Here, the first direction and the second direction may represent various directions intersecting with each other. For example, the first direction may correspond to an up→down direction (or a down→up direction), and the second direction may correspond to a left→right direction (or a right→left direction). At this time, the six coils may be arranged so that at least a part of the six coils overlap each other in the first and second directions.

The size of each coil included in the coil assembly may be about 110 mm×70 mm (w/Ferrite), and the maximum charging area that can be generated by the coil assembly may be about 60 mm×46 mm (w/Ferrite).

The coil assembly of the fourth embodiment can also operate in the multi-coil drive system as the third embodiment.

Hereinafter, the configuration unit of the power transmitter including the coil assembly operating in the multi-coil drive system will be described as in the third and fourth embodiments.

FIG. 5 is a block diagram illustrating a power transmitter including a coil assembly according to a third or fourth embodiment. Since the power transmitter including the coil assembly according to the third or fourth embodiment transfers power using an "array" of a plurality of overlapping coils (i.e., because it applies the multi-coil drive system), the positional freedom of the power receiver is ensured.

Referring to FIG. 5, a power transmitter 5010 may include a power conversion unit 5020 and a communication/control unit 5030, which are roughly two main units. The power conversion unit 5020 can perform communication with the communication/control unit 5030.

The power conversion unit 5020 may take charge of/include an analog part of the power transmitter 5010 design including the coil assembly according to the third or fourth embodiment. Further, the power conversion unit 5020 may include an inverter, an impedance matching network, a sensing circuit, and/or a multiplexer.

A direct current (DC) input of the power conversion unit 5020 (or the inverter) may be received and converted to an AC waveform for driving a resonant circuit including a selected/connected coil. Here, the selected/connected coil may mean an array of coils (or a plurality of coils) suitably selected according to a position of the power receiver among the coils arranged according to the third or fourth embodiment.

The selection of the coil may be performed/proceed in real time as the power transmitter 5010 (or the power conversion unit 5020/the multiplexer) performs communications/attempts to communicate with the power receiver using at least one coil (or all the coils in order) included in the coil assembly. That is, the power transmitter 5010 (or the power conversion unit 5020/the multiplexer) can obtain the position of the power receiver by performing communication with the power receiver using at least one coil, and select one coil at a position corresponding to the position of the power receiver.

For example, the power transmitter 5010 (or the power conversion unit 4020/the multiplexer) may attempt to communicate with the power receiver using the first through sixth coils included in the coil assembly, and assume that the communication with the power receiver attempted using the first coil is successful. In this case, the power transmitter 5010 (or the power conversion unit 5020) can infer/predict that a current power receiver is lying on the first coil (or closest to the first coil), and can select the first coil as a coil to be driven for charging the power receiver.

Alternatively, although not shown in the drawing, the power transmitter 5010 (or the power conversion unit 5020) may include a separate sensor (for example, a proximity sensor, an infrared sensor, or the like) for obtaining the position of the power receiver. In this case, the power transmitter 5010 may use the sensor to obtain the position of the power receiver, and may select a coil at a position suitable for charging the power receiver as a driving coil.

The power conversion unit 5020 (or the impedance matching network) may form a resonant circuit for a part of the selected/connected coils. Further, the power conversion unit 5020 (or the sensing circuit) can continuously monitor the current/voltage of the selected/connected coils.

The power conversion unit 5020 (or the multiplexer) may be connected to a suitable coil capable of transferring power to the power receiver and/or release the connection with a unsuitable coil based on the position of the power receiver. Here, the suitable coil capable of transferring power to the power receiver may refer to at least one coil that is capable of forming a charging area at the position of the power receiver.

The communication/control unit 5030 may take charge of/include a digital logic part of the power transmitter 5010 design including the coil assembly according to the third or fourth embodiment.

More specifically, the communication/control unit 5030 can receive and decode a message transmitted from the power receiver, configure a multiplexer to be connected to a suitable coil array, and execute a power control algorithm/protocol associated therewith. Further, the communication/control unit 5030 can drive an inverter for controlling an amount of power to be provided to the power receiver. Further, the communication/control unit 5030 can interface with other subsystems of the base station (for example, for the purpose of user interface).

Although the power conversion unit 5020 and the communication/control unit 5030 are separately shown and described in this block diagram, the present invention is not limited thereto, and at least one of the functions performed by the power conversion unit 5020 is performed by the communication/control unit 5030, or at least one of the functions performed by the communication/control unit 5030 may be performed by the power conversion unit 5020. In addition, the power conversion unit 5020 and the communication/control unit 5030 may be formed of separate chips in hardware or may be formed of one chip.

As mentioned above, various constructions of the coil assembly that can be included in the power transmitter and the block diagram of the power transmitter according to the driving method of the coil assembly have been described.

Table 1 below summarizes hardware characteristics of the coil assemblies according to the first to fourth embodiments.

TABLE 1

| Type | First Embodiment | Second Embodiment | Third Embodiment (Fourth Embodiment) |
|---|---|---|---|
| Coil Size (mm) | 94 mm × 53 mm (w/Ferrite) | 115 mm × 68 mm (w/Ferrite) | 110 mm × 70 mm (w/Ferrite, TBD) |
| Maximum Charging Area (mm) | 60 mm × 20 mm | 60(70) mm × 40 mm | 60(46) mm × 46 mm |
| Number of Coils | 3 | 3(4) | 6 |
| Detection of Foreign object | Normal | Weak | Normal |
| Efficiency | Good | Low | Good |
| Driving Method | Single-Coil Drive | Single-Coil Drive | Multi-Coil Drive |
| WCA dimension (mm) | 98 mm × 23 mm × 15.5 mm (26 mm Height-Connector) | 120 mm × 143 mm × 30* mm | 120 mm × 143 mm × 30* mm |

In Table 1, the values indicated in the coil size and mm unit each can have an error range of maximum ±5 mm.

Referring to Table 1, it can be seen that the fourth embodiment has the best performance in terms of charging area and efficiency. Further, when the multi-coil drive system is applied to the coil assembly of the fourth embodiment, there is an effect that a dead zone (area) is reduced as compared with the single coil system, which will be described in detail below with reference to FIG. 6.

Meanwhile, in this specification, an area where a receiver coil of the power receiver is induced to have a voltage higher than a threshold voltage (i.e., an area where the power receiver can be charged) may be referred to as an active zone (area), and an area where the receiver coil of the power receiver is not induced to have the voltage higher than the threshold voltage (i.e., an area where the power receiver cannot be charged) may be referred to as a dead zone (area).

FIG. 6(*a*) is a view showing an application example in which a single-coil drive system is applied to a coil assembly. FIG. 6(*b*) is a view showing an application example of a multi-coil drive system. In FIGS. 6(*a*) and 6(*b*), it is assumed that a power receiver is located at a center of a coil assembly of a power transmitter.

Referring to FIG. 6(*a*), the power transmitter may apply a single-coil drive system that drives only one coil at a time among transmitter coils comprising a transmitter coil assembly (or a transmitter coil array). Therefore, the power transmitter of the present embodiment can drive only one of two coils even if all of the two transmitter coils can perform power transference to the power receiver (or receiver coil/secondary coil).

In this way, when the single-coil drive system is applied, only a magnetic field passing through one coil affects the power receiver as shown in the drawing, and a dead zone 6010 in which the power receiver cannot be charged is generated. As a result, a chargeable area for the power receiver is reduced, and charging efficiency is also reduced.

Conversely, referring to FIG. 6(*b*), the power transmitter may apply a multi-coil drive system that drives simultaneously a plurality of coils among transmitter coils comprising a transmitter coil assembly (or a transmitter coil array). Therefore, the power transmitter of the present embodiment can drive all of the two transmitter coils that can perform power transference to the power receiver.

When the multi-coil drive system is applied, the dead zone 6010 is not generated because a magnetic field passing through inner sides of the two transmitter coils all affect the power receiver. Particularly, when the inner sides of the two transmitter coils are arranged so as to meet or overlap each other (or when the through hole of each coil and the through hole of the adjacent coil in the first or second direction are arranged so as to be adjacent to each other on the plane), a distance of a magnetic field passing through a center of each coil becomes close to each other, so that the dead zone can be further minimized. As a result, there is an effect that the chargeable area for the power receiver is increased as compared with the single-coil drive system, and the charge efficiency is also increased.

Accordingly, in order to design a more efficient power transmitter, the present specification proposes the fourth embodiment in which the plurality of coils are arranged in the first and the second direction in a superimposed manner as a transmitter coil assembly structure. Further, in the present specification, it is proposed to apply a multi-drive system that drives simultaneously the plurality of coils to the power transmitter to minimize the dead zone.

FIG. 7 is a diagram illustrating a coil assembly structure and an equivalent circuit according to an embodiment of the present invention.

Referring to FIG. 7(*a*), the coil assembly of the power transmitter may include six coils as described above, and two coils in the first direction and three coils in the second direction may be arranged (3×2). Here, the first direction and the second direction may represent various directions intersecting with each other. For example, the first direction may correspond to an up→down direction (or a down→up direction), and the second direction may correspond to a left→right direction (or a righ→left direction). At this time, the six coils may be arranged so that at least a part of the coils are mutually overlapped each other in the first and second directions, and in particular, the inner sides between the neighboring coils may be arranged to meet or overlap each other.

In addition, the coil assembly of the power transmitter may operate in the multi-drive system to widen the charging area and minimize the dead zone as described above.

In this case, the power transmitter can basically determine multi-driven coils based on a position of the power receiver. That is, the power transmitter may determine the coils of the position capable of power transference to the power receiver or the coils that can form the magnetic field to the position of the power receiver as the multi-driven coils. The power transmitter may multi-drive the coils by controlling the current to flow in the same direction of rotation to the determined coils.

However, in this case, in order to minimize the dead zone, the power transmitter may selectively multi-drive "coils neighboring/overlapping in the first and second directions" among the coils at positions where power transference to the power receiver is possible. The reason is that, when coils located in a diagonal direction are simultaneously driven, the magnetic field passing through the center of each coil and the magnetic field passing through the center of the other coil are separated in the first direction and the dead zone cannot be minimized.

Therefore, when the power transmitter is limited to two coils that can be driven simultaneously, in the case of the coil assembly of FIG. 7(a), the combination of coils that can be multi-driven may be 7 combinations such as (1, 2), (2, 3), (1, A), (2, B), (3, C), (A, B), and (B, C). In addition, the combination of coils that cannot be driven simultaneously may be (A, 2, C) and (1, B, 3).

That is, the number of multi-drivable coil combinations (C_operating) for a coil assembly including 2n coils can be expressed by the following Equation 1.

$$C_{operating} = 3*n - 2 \quad \text{[Equation 1]}$$

In this manner, an equivalent circuit for the coil assembly of FIG. 7(a) in which the maximum of two coils are multi-driven, but the coils located neighboring/overlapping in the first and second directions are multi-driven, and the coils located in the diagonal direction are not multi-driven can be represented as FIG. 7(b).

Although the present embodiment has been described above with respect to the embodiment in which a maximum of two coils are multi-driven, however, the present invention is not limited thereto, and multi-drive can be performed regardless of the number of coils located neighboring/overlapping in the first and second directions. In this case, however, currents must flow in the same direction of rotation to the coils that are multi-driven at the same time.

FIG. 8(a) is a plan view of a coil assembly comprised of two coils, FIG. 8(b) is a side view of a coil assembly viewed from direction A, and FIG. 8(c) is a side view of a coil assembly viewed from direction B.

The coils comprising the coil assembly must have the same inductance value on average. In order to satisfy this, a shield and/or a spacer together with the coils may be included in the coil assembly.

Referring to FIGS. 8(a) to 8(c), the coils may be sequentially stacked on the shield to form the coil assembly. In this case, as described above, at least portion of the each coil may be stacked so as to overlap each other (see FIG. 8(a)). In the case of comprising the coil assembly with coils of multiples of two, another coil stacked on a specific coil floats from the shield, so that the spacer is inserted between the two coils to keep a gap between the two coils constant. At this time, the inserted spacer may correspond to a nonmagnetic material.

On the other hand, although not shown in the drawing, when a coil assembly is comprised by coils of multiples of three, since one coil is attached on two coils, the spacer may not be further inserted.

FIG. 9(a) is a plan view of a coil assembly comprised of four coils, FIG. 9(b) is a side view of a coil assembly viewed from direction A, and FIG. 9(c) is a side view of a coil assembly viewed from direction B.

Referring to FIGS. 9(a) to 9(c), coils may be sequentially stacked on a shield to form a coil assembly. Particularly, in case of a coil assembly comprised of four or more coils, in addition to a first-layer shield stacked on a lowermost layer, a second-layer shield can be used. The second-layer shield may be stacked on the first-layer shield and serve to support other coils stacked on the coils stacked on the first-layer shield.

Thus, by using the second-layer shield, an inductance of the coils stacked on the second-layer shield can be made the same/similar size as that of the coils stacked on the first-layer shield. Furthermore, in order to keep the inductance values between the coils equal/similar, the number of turns of each coil to be stacked and the coil size may be different from each other.

Although not shown in this drawing, even when a coil assembly is used using six coils, a plurality of shields for supporting the coils stacked on the lowest layer may be used, and the inductance values between the coils stacked on each shield can be kept equal/similar.

FIG. 10 is a graph showing experimental results of a charging area of a power transmitter using a coil assembly structure according to an embodiment of the present invention. More specifically, FIG. 10(a) is a coil assembly structure used in the experiment, and FIG. 10(b) is a graph showing experimental results of a charging area of the coil assembly of FIG. 10(a).

Referring to FIG. 10(a), a maximum distance between insides of the coils arranged in the first direction of the coil assembly can be set to about 50 mm, and a maximum distance between insides of the coils arranged in the second direction may be set to about 70 mm. In this case, as shown in FIG. 10(b), the chargeable area (i.e., active zone) of the coil assembly shown in FIG. 10(a) was very wide, about 60 mm×46 mm, and almost no dead zone was found.

FIG. 11 is a flowchart illustrating a power transference method of a power transmitter according to an embodiment of the present invention. In the present flowchart, the description described above with reference to FIGS. 1 to 10 can be applied equally/similarly, and redundant description will be omitted.

First, a power transmitter can obtain a position of a power receiver using a coil assembly including a plurality of coils (S11010).

For example, the power transmitter may attempt to communicate with the power receiver using first through sixth coils included in the coil assembly, and it can be assumed that the communication with the power receiver attempted using the first coil is successful. In this case, the power transmitter can infer/predict that a current power receiver is lying on the first coil (or closest to the first coil) and can select the first coil as a coil to drive for charging the power receiver. Alternatively, the power transmitter may have a separate sensor for obtaining the position of the power receiver to sense the position of the power receiver.

Next, the power transmitter can charge the power receiver by multi-driving coils at positions corresponding to the position of the power receiver (S11020).

Here, the multi-driving may correspond to applying simultaneously AC to a coil pair which corresponds to a position of the power receiver among the plurality of coils and neighbors in first and second directions, and correspond to applying the AC so that the AC flows in a same direction of rotation in the coil pair.

As described above, when the neighboring coil pair in the first or second direction are simultaneously driven (that is, when the multi-coil drive system is applied), an active zone, which is a chargeable zone, increases, and a dead zone, which is a non-chargeable zone, is reduced. As a result, an effect of increasing the charging performance for the power receiver occurs.

The multi-coil drive system and the coil structure of the wireless power transceiver to which the multi-coil drive system is applied have been described. Hereinafter, a bidirectional communication protocol method for a wireless power transference/reception period for more securely transferring/receiving wireless power will be described.

FIG. 12 is a flowchart illustrating a charging control process in a wireless power transference/reception period for wireless power transference according to an embodiment of the present invention.

Referring to FIG. 12, a wireless power transmitter Tx may first be in a ready/standby state in which power is not transferred to a wireless power receiver Rx (S12010).

Next, the wireless power transmitter Tx may recognize the wireless power receiver Rx (S12020). At this time, the wireless power transmitter Tx may recognize the wireless power receiver Rx according to various embodiments. For example, as described above, the power receiver may be recognized by using a separate sensor (e.g., proximity sensor, infrared sensor, etc.) or the like for performing communication with the power receiver or obtaining a position of the power receiver.

Next, the wireless power transmitter Tx may perform charging setting for power transference/reception with the wireless power receiver Rx (S12030) and adjust a power level to be transferred to the wireless power receiver Rx according to the charging setting (S12040). More specifically, the wireless power receiver Rx, for the charging setting of the wireless power transmitter Tx, may transfer maximum power information, which is information about a (maximum) power level to be received (or receivable) by itself, to the wireless power transmitter Tx. The wireless power transmitter Tx can adjust the power level to be transferred to the wireless power receiver Rx while performing the charging setting to the wireless power receiver Rx based on the received maximum power information.

Next, the wireless power transmitter Tx may charge the wireless power receiver Rx by transferring power to the wireless power receiver Rx (S12050).

Steps S12040 and S12050 may be defined as voltage control loops, when a change occurs in the (maximum) power level to be received (or receivable) as the power is received, the power receiver may return to the step S12040 to request the power transmitter to adjust the transference power. To this end, the wireless power receiver Rx may request the wireless power transmitter Tx to adjust the power level by transmitting information about the new (maximum) power level to be received (or receivable) to the wireless power transmitter Tx. The wireless power transmitter Tx may adjust the power level to be transferred to the wireless power receiver Rx by performing the step S12050, at the request of this wireless power receiver Rx.

Finally, when the charging is completed, the wireless power receiver Rx may request the wireless power transmitter Tx to terminate the charging (S12060).

In the charging control process between the wireless power transceivers (Tx, Rx) of the above-described flowchart, the wireless power receiver Rx is implemented in a manner that adjusts dominantly the transference power level. That is, the wireless power receiver Rx directly requests the power level it wants to receive to the wireless power transmitter Tx and the wireless power transmitter Tx adjusts the transference power level at the request of the wireless power receiver Rx.

Although not shown in this flowchart, conventionally, the wireless power transmitter Tx started charging in a medium power transference mode (a mode capable of charging up to 15 W), but in the case of overheating, it stopped charging by itself and returned to the standby step, in the charging setting step, a low power mode (a mode capable of charging up to 5 W) was set and the charging of the wireless power receiver Rx was resumed. When a temperature of the wireless power transmitter Tx fell below a predetermined temperature, the wireless power transmitter Tx returned to the standby step and resumed charging of the wireless power receiver Rx by resetting to the medium power transference mode in the charging setting step.

In accordance with this charging control process, in situations where the transference power level must be lowered as the wireless power transmitter Tx overheats, the charging efficiency of the wireless power receiver Rx may deteriorate because of stopping transferring power by itself without negotiating separately with the wireless power receiver Rx.

Accordingly, in this specification, in order to solve this problem, a bidirectional communication mechanism between the wireless power transmitter Tx and receiver will be proposed so that the wireless power transmitter Tx may also adjust the transference power level.

FIG. 13 is a flowchart illustrating a charging control process between wireless power transceivers Tx, Rx for wireless power transference in according to an embodiment of the present invention. Steps S13010 to S13050 and S13070 in this flowchart may be applied to the same or similar descriptions as described above with reference to steps S12010 to S12060 described above in FIG. 12. In addition, with reference to this flowchart, differences from the embodiment of FIG. 12 will be mainly described, and redundant description will be omitted.

Referring to FIG. 13, unlike in the embodiment of FIG. 12, a bidirectional communication mechanism between the wireless power transceiver (Tx, Rx) may be performed by newly adding step S13060 in which the wireless power transmitter Tx requests maximum power adjustment. In addition, in this embodiment, steps S13040 to S13060 may be defined as voltage control loops.

More specifically, the wireless power transmitter Tx may transmit a request to adjust the (maximum) power level to the wireless power receiver Rx when it is determined that it is necessary to adjust the transference power level during charging (S13060). This request may include maximum power level information about a new (maximum) power level required by the wireless power transmitter Tx.

A case where it is determined that the wireless power transmitter Tx needs to adjust the transference power level may be a case where a current temperature detected by the wireless power transmitter Tx exceeds a preset temperature, or a case where foreign object is detected, or the like.

For example, it may be a case where a hazardous situation may occur during continuous power transference of the wireless power transmitter Tx such as a case where a vehicle in which the wireless power transmitter Tx is installed is heated and the temperature increases, a case where the wireless power transmitter Tx detects an overheating of the wireless power receiver Rx being charged and/or foreign object, or a case where foreign object (for example, NFC card (traffic, credit card, etc.)) between the wireless power transmitter Tx and the wireless power receiver Rx is detected, etc. To this end, the wireless power transmitter Tx may be provided with a hardware configuration such as a temperature sensor capable of measuring the current temperature and/or a foreign object detection module capable of detecting foreign object.

In this case, the wireless power transmitter Tx may transmit a request to reduce the (maximum) power level to the wireless power receiver Rx, and such a request may include adjustment power level information about a new (maximum) power level that is set to be less than the current power level.

Further, a case where it is determined that the wireless power transmitter Tx needs to adjust the transference power level may be a case where the wireless power transmitter Tx detects that a temperature exceeded a predetermined temperature falls below the predetermined temperature or a case where the foreign object that has been detected is removed.

In this case, the wireless power transmitter Tx may transmit a request to increase the (maximum) power level to the wireless power receiver Rx, and such a request may include adjustment power level information about a new (maximum) power level that is set to be greater than the current power level.

The wireless power receiver Rx that has received the (maximum) power level adjustment request from the wireless power transmitter Tx may return to step S13040 and request the wireless power transmitter Tx to adjust the (maximum) power level based on the request. More specifically, the wireless power receiver Rx may determine a (maximum) power level within a new (maximum) power level indicated by the adjustment power level information included in the request, and request power adjustment to the determined (maximum) power level to the wireless power transmitter Tx.

Next, the wireless power transmitter Tx may charge the wireless power receiver Rx by adjusting the power to the newly requested (maximum) power level from the wireless power receiver Rx (S13060).

According to this embodiment, the wireless power transceiver (Tx, Rx) has an effect of transferring power more stably and efficiently by suitably negotiating/adjusting the level of power to be transferred according to the transference environment and situation according to the power control loop. Further, according to the present embodiment, it does not occur in a situation where the power transmission is interrupted unilaterally by the wireless power transmitter Tx, and the effect that the charging time is reduced occurs.

FIG. 14 is a diagram illustrating a method of controlling overheat prevention in a multi-coil according to an embodiment of the present invention.

In a wireless power transmitter Tx including a coil assembly comprised of multi-coils, as shown in FIG. 14, charging efficiency is lowered and a possibility of heat generation is high under poor coupling condition that the coils of the wireless power transmitter Tx and the coils of the wireless power receiver Rx do not match. To prevent this, the wireless power transmitter Tx may selectively drive at least one coil during power transference. In addition, the wireless power transmitter Tx may be configured to request the wireless power transmitter Tx that is located at an outer perimeter where transference/charging efficiency is low to lower the requested power level below a predetermined level.

More specifically, for example, when the wireless power transmitter Tx detects a first position (a position where the coupling is good (for example, a center portion of the coil assembly) as a position of the wireless power receiver Rx, it may drive a plurality of coils in multiple ways/simultaneously to transfer high power (up to 15 W) to the corresponding wireless power receiver Rx. Alternatively, when the wireless power transmitter Tx detects a second position (a position where the coupling is not good (for example, an outer portion of the coil assembly) as a position of the wireless power receiver Rx, it may selectively drive only one coil to transfer low power (up to 5 W) to the corresponding wireless power receiver Rx.

To this end, the wireless power transmitter Tx may transmit information about an suitable power level according to the position of each wireless power receiver Rx to the wireless power receiver Rx so that the wireless power receiver Rx may request/set a suitable power level according to its position.

For example, when the wireless power transmitter Tx detects the first position (the position where the coupling is good (for example, the center portion of the coil assembly) as the position of the wireless power receiver Rx, the wireless power transmitter Tx may indicate to the wireless power transmitter Tx that a current settable (maximum) power level is possible up to 15 W. Accordingly, the wireless power receiver can set a (maximum) power level that can be received up to 15 W in the charge setting step.

Alternatively, when the wireless power transmitter Tx detects the second position (the position where the coupling is not good (for example, the outer portion of the coil assembly) as the position of the wireless power receiver Rx, the wireless power transmitter Tx may indicate to the wireless power transmitter Tx that a current settable (maximum) power level is possible up to 5 W. Accordingly, the wireless power receiver can set the maximum power level that can be received up to 5 W in the charge setting step.

FIG. 15 is a flowchart illustrating a power transference method of a wireless power transmitter according to an embodiment of the present invention. The description of the above-described embodiments with respect to this flowchart can be applied equally/similarly, and redundant description will be omitted.

First, a wireless power transmitter can recognize a wireless power receiver (S1510). At this time, the wireless power transmitter may include various hardware configurations for recognizing the wireless power receiver, and detailed description related thereto is as described above.

Next, the wireless power transmitter may receive a first maximum power level information about a first maximum power level that the wireless power receiver can receive from the wireless power receiver (S1520). Next, the wireless power transmitter may determine a level (less than the first maximum power level) of power to be transferred to the wireless power receiver based on the first maximum power level information received from the wireless power receiver, and transfer the determined level of power to the wireless power receiver (S1530).

Next, the wireless power transmitter may detect a current temperature (S1540). To this end, the wireless power transmitter may have various hardware configurations (e.g., temperature sensors, etc.) to detect the current temperature.

Next, the wireless power transmitter may transmit adjustment power level information indicating a power level that is greater than or less than the first maximum power level to the wireless power receiver based on the detected current temperature (S1550). Here, the adjustment power level information may indicate a power level that is less than the first maximum power level when the detected current temperature is higher than a predetermined temperature. Alternatively, the adjustment power level information may indicate a power level that is higher than the first maximum power level when the detected current temperature is lower than a predetermined temperature.

Next, the wireless power transmitter may receive second maximum power level information about a second maximum power level adjusted based on the adjustment power level information from the wireless power receiver (S1560). Next, the wireless power transmitter may transfer power to the wireless power receiver at a power level determined based on the received second maximum power level information (S1570).

Although not shown in the present flowchart, when the wireless power transmitter includes a coil assembly comprised of a plurality of coils, the wireless power transmitter may obtain a position of the wireless power receiver using the coil assembly. In this case, the wireless power transmitter may transmit information about a maximum power level that the wireless power transmitter can supply based on the obtained position of the wireless power receiver to the wireless power receiver. A maximum power level in case of obtaining a first position as the position of the wireless power receiver may be set to be greater than a maximum power level in case of obtaining a second position as the position of the wireless power receiver. Here, the first position may correspond to a central portion of the coil assembly of the wireless power transmitter and the second position may correspond to an outer portion of the coil assembly of the wireless power transmitter.

When the first position is obtained as the position of the wireless power receiver, the wireless power transmitter may multi-drive at least some of the plurality of coils included in the coil assembly. Here, the multi-driving means that the plurality of coils are simultaneously driven by simultaneously applying a current/voltage to at least two coils of the coils included in the coil assembly. When the second position is obtained as the position of the wireless power receiver, the wireless power transmitter may selectively drive one coil at a position corresponding to the second position of the plurality of coils included in the coil assembly.

Although the present invention has been described with reference to individual drawings for the convenience of description, it is still possible to design so that embodiments described with reference to each drawing may be merged to implement a new embodiment. Further, the wireless power transceiver is not limited to configurations and methods of the embodiments described above, but the entire or part of the embodiments may be combined selectively so that various modifications may be made to the embodiments.

Further, although the exemplary embodiments have been illustrated and described above, the present specification is not limited to the aforementioned specific embodiments, various modifications may be made by those skilled in the art to which the present specification belongs without departing from the subject matters of the present invention that are claimed in the claims, and these modifications should not be understood individually from the technical spirit or prospect of the present specification.

MODE FOR INVENTION

Various embodiments have been described in a best mode for executing the present invention.

INDUSTRIAL APPLICABILITY

The present invention may be applied to various wireless charge technologies.

The invention claimed is:

1. A wireless power transmitter for transferring power to a wireless power receiver, the wireless power transmitter comprising:
    a coil assembly including a plurality of coils;
    a power conversion unit configured to convert an input direct current (DC) into an alternating current (AC) for driving the coil assembly; and
    a communication/control unit configured to communicate with the wireless power receiver and control an amount of power to be transferred to the wireless power receiver using the coil assembly,
    wherein the plurality of coils are arranged in first and second directions, and
    wherein each of the plurality of coils:
    has a substantially rectangular frame structure having a through hole at a center, and
    is arranged so that at least portion of the each coil overlaps, in a plane, with a neighboring coil in the first and second directions.

2. The wireless power transmitter of claim 1, wherein the first and second directions are substantially orthogonal to each other.

3. The wireless power transmitter of claim 2, wherein the first direction corresponds to a vertical direction or an up-and-down direction, and the second direction corresponds to a horizontal direction or a left-to-right direction, respectively.

4. The wireless power transmitter of claim 2, wherein the plurality of coils are arranged in a superimposed manner so that the through hole of the each coil is adjacent to a through hole of the neighboring coil in the first or second direction.

5. The wireless power transmitter of claim 4, wherein the plurality of coils are comprised of six coils.

6. The wireless power transmitter of claim 4, wherein the plurality of coils have different numbers of turns and sizes from each other, to have substantially a same inductance value.

7. The wireless power transmitter of claim 1, wherein the power conversion unit is configured to obtain a position of the wireless power receiver using the coil assembly, select a plurality of coils at a position corresponding to the position of the wireless power receiver, and apply the AC to the selected plurality of coils.

8. The wireless power transmitter of claim 7, wherein the selected plurality of coils by the power conversion unit correspond to a coil pair neighboring in the first or second direction.

9. The wireless power transmitter of claim 8, wherein the power conversion unit is configured to apply the AC to the coil pair so that the AC flows in the same direction of rotation in the selected coil pair.

10. A power transference method of a wireless power transmitter for transferring power to a wireless power receiver, the power transference method comprising:
obtaining a position of the wireless power receiver using a coil assembly including a plurality of coils; and
multi-driving coils, among the plurality of coils, at a position corresponding to the position of the wireless power receiver,
wherein the multi-driving includes applying simultaneously an alternating current (AC) to a coil pair so that the AC flows in a same direction of rotation in the coil pair, and
wherein the coil pair, among the plurality of coils, are located in a position corresponding to the position of the wireless power receiver and are neighboring coils in a first or second direction.

11. The power transference method of claim 10,
wherein the plurality of coils are arranged in the first and second directions, and
wherein each of the plurality of coils:
has a substantially rectangular frame structure having a through hole at a center, and
is arranged so that at least portion of the each coil overlaps, in a plane, with a neighboring coil in the first and second directions.

12. The power transference method of claim 10, wherein the first and second directions are substantially orthogonal to each other.

13. The power transference method of claim 10, wherein the first direction corresponds to a vertical direction or an up-and-down direction, and the second direction corresponds to a horizontal direction or a left-to-right direction, respectively.

14. A power transference method of a wireless power transmitter for transferring power to a wireless power receiver, the power transference method comprising:
recognizing the wireless power receiver;
receiving, from the wireless power receiver, first maximum power level information about a first maximum power level that the wireless power receiver is capable of receiving;
transferring the power to the wireless power receiver at a power level determined based on the first maximum power level information;
detecting a current temperature;
transmitting, to the wireless power receiver, adjustment power level information indicating a power level that is greater than or less than the first maximum power level based on the detected current temperature;
receiving, from the wireless power receiver, second maximum power level information about a second maximum power level adjusted based on the adjustment power level information; and
transferring the power to the wireless power receiver at a power level determined based on the second maximum power level information.

15. The power transference method of claim 14, wherein the adjustment power level information indicates a lower power level than the first maximum power level when the detected current temperature is higher than a predetermined temperature, and a higher power level than the first maximum power level when the detected current temperature is lower than the predetermined temperature.

16. The power transference method of claim 14, further comprising:
obtaining, when the wireless power transmitter includes a coil assembly comprised of a plurality of coils, a position of the wireless power receiver using the coil assembly; and
transmitting to the wireless power receiver information about a maximum power level that the wireless power transmitter is capable of supplying based on the obtained position of the wireless power receiver.

17. The power transference method of claim 16, wherein a maximum power level when obtaining a first position as the position of the wireless power receiver is set to be greater than a maximum power level when obtaining a second position as the position of the wireless power receiver.

18. The power transference method of claim 17, wherein the first position corresponds to a center part of the coil assembly of the wireless power transmitter, and the second position corresponds to an outer part of the coil assembly of the wireless power transmitter.

19. The power transference method of claim 17, further comprising:
multi-driving, when the first position is obtained as the position of the wireless power receiver, at least some of the plurality of coils included in the coil assembly; and
selectively driving one coil, among the plurality of coils included in the coil assembly, at a position corresponding to the second position when the second position is obtained as the position of the wireless power receiver.

20. A power receiving method of a wireless power receiver for receiving power from a wireless power transmitter, the power receiving method comprising:
recognizing the wireless power transmitter;
transmitting, to the wireless power transmitter, first maximum power level information about a first maximum power level that, the wireless power receiver is capable of receiving;
receiving the power from the wireless power transmitter at a power level which is identical to or lower than the first maximum power level;
receiving, from the wireless power transmitter, adjustment power level information indicating a power level that is greater than or less than the first maximum power level;
receiving, from the wireless power transmitter, second maximum power level information about a second maximum power level obtained by adjusting the first maximum power level based on the adjustment power level information; and
receiving the power from the wireless power transmitter at a power level which is identical to or lower than the second maximum power level.

* * * * *